May 27, 1969
C. GOMELLA
3,446,357
CLARIFYING VESSEL FOR LIQUIDS
Filed Aug. 29, 1967
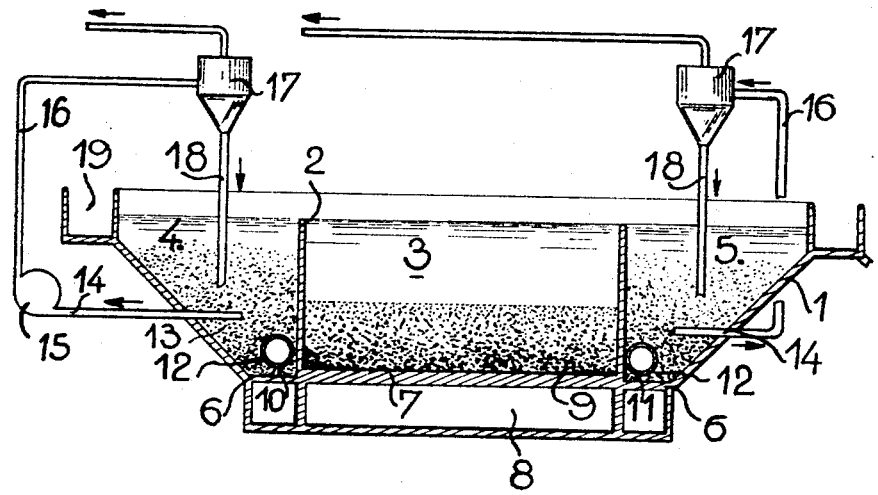

United States Patent Office 3,446,357
Patented May 27, 1969

3,446,357
CLARIFYING VESSEL FOR LIQUIDS
Cyril Gomella, Maisons-Laffitte, France, assignor to Société d'Etudes pour le Traitement et l'Utilisation des Eaux (S.E.T.U.D.E.), Paris, France, a French society
Filed Aug. 29, 1967, Ser. No. 664,200
Claims priority, application France, Sept. 28, 1966, 78,056
Int. Cl. B01d 21/10
U.S. Cl. 210—195                    7 Claims

ABSTRACT OF THE DISCLOSURE

A clarifying vessel for liquids containing impurities comprising a general exterior container within which is arranged a pretreatment compartment for a fluidized bed process through which the impure liquid is arranged to initially travel from bottom to top and a filtration compartment through which the pretreated liquid is subsequently arranged to travel from top to bottom, these two compartments being adjacent in the interior of the general container and being separated one from the other by a dividing wall which is less than the height of the general exterior container.

---

The object of the invention is to provide a new type of vessel for clarifying liquids containing impurities and which can be used with the process set forth in applicant's co-pending U.S. patent application Ser. No. 664,201 entitled "Process for the Clarification of Liquids" and filed Aug. 29, 1967.

In the patent specification referred to the process using the fluidised bed constitutes for certain requirements a pretreatment which enables a standard or well know type of filtration to be obtained but which is much faster and at the same time, produces a better purification.

It is therefore, useful to provide a clarifying vessel for combined action, which can be used to apply successively, in the most economic manner from the point of view of the construction and the cost of operation, the process with the fluidisation bed and the standard filtration. This vessel should also be able to be utilised if necessary for putting into operation either the fluidised bed process or the standard filtration by itself, if this is considered useful, without making any changes to its construction.

According to the present invention a clarifying vessel comprises a general exterior envelope within which is arranged a pretreatment compartment for a fluidised bed process through which the impure liquid is arranged to initially travel from bottom to top and a standard filtration compartment through which the pretreated liquid is subsequently arranged to travel from top to bottom, these two compartments being adjacent in the interior of the general envelope and being separated from one another by a dividing wall the height of which is less than the height of the general exterior container.

The filtration compartment is preferably situated in the central part of the general envelope and is surrounded by the pretreatment compartment.

In accordance with a preferred embodiment, the cross section of the pretreatment compartment is in the form of a trapezium the small base of which is placed at the lowest level.

The invention may be performed in many ways but one embodiment will now be described by way of example and with reference to the accompanying drawing which shows a diagrammatic cross sectional side view of a vessel according to the invention.

As shown in the drawing the clarifying vessel has a general exterior wall 1 in the interior of which is provided an interior dividing wall 2. It will be seen that the height of this wall is less than that of the exterior wall 1.

The wall 2 defines in the space within the wall 1 a filtration compartment indicated at 3 and compartments 4 and 5 in which a pretreatment process can be carried out by means of a fluidised bed.

There may be only a single compartment 4 or 5 surrounding the central compartment 3 or alternatively several compartments 4 and 5 which are separated from each other by transverse walls (not shown) may be provided.

To facilitate the application of the process using the fluidised bed the compartments 4 and 5 have a trapedzoidal section the small base 6 of which is at the lowest level.

The bases 6 and 7 respectively and the compartments 4, 5 and 3 are in the same horizontal plane and a collecting chamber 8 is provided under the compartment 3 which is filled in part, with sand 9 in a known manner. The lower part of chambers 4 and 5 are provided with conduits 10 and 11 in the vicinity of the wall 1 for the introduction of the impure water to be clarified. Conduits 10 and 11 are provided with a series of exit holes 12 which open towards the bottom and towards the exterior wall 1. This arrangement is not essential but it has been found that it facilitates the fluidisation of the material 13 contained in comparts 4 and 5.

A pipe 14 opens into the middle of the fluidised bed 13 and is connected to the inlet orifice of a pump 15. The output orifice of the pump is connected by a pipe 16 to a hydrocyclone 17, the lower orifice of which is extended by a pipe 18 which opens into the centre of the corresponding compartment 4 or 5.

The exterior wall 1 is provided at its uuper end with a spout 19 for the discharge of washing water. This washing water, which is used to wash the filtration bed 9 when it has become overcharged with suspended material and which may enter through the chamber 8 or in any other known manner, travels upwardly through the filtration bed carrying the material suspended in the bed therewith. This washing operation produces a rise in the level of the water in the compartments up to the edge of the rim of the outer wall 1 and the washing waters, containing the majority of the suspended material which was held in the filtration bed, can thus spill over into the spout 19 to be carried away. After the bed 9 has been washed sufficiently, so as to be capable of further use, the washing process is halted and the washing water remaining in the compartments 3, 4 and 5 is drained off by any conventionally known manner.

The contaminated water to be treated arrives through the channels 10 and 11, passes through the holes 12, and moves from the bottom to the top of the bed of material 13 thus causing and maintaining the bed in, the fluidised state. The water then passes over the top of the wall 2 moves from top to bottom in the compartment 3 through the sand 9 and gathers in the collecting chamber 8 from which it is extracted having been suitably clarified.

No explanation will be given here of the complex action which takes place in the compartments 4 and 5, and which is described in the applicant's corresponding application referred to above.

As described in application S.N. 664,201, the circuit 14 to 18, including the pump 15 and the hydrocyclone 17 provides means to remove from the fluidised bed, the agglomerated impurities which, in certain cases, accumulate therein, and the conduit 18 acts to return to the compartments 4 and 5 the material 13 which cannot be prevented from being withdrawn in the pipe 14 at the same time as the agglomerated impurities.

It will be noted that merely removing the sand 9 makes it possible to operate the fluidised bed process without the subsequent filtration. Conversely it is possible to carry out merely the filtration process by removing the fluidised material 13 without making any change in the vessel in accordance with the invention.

If desired the construction arrangement could be reversed by placing a pretreatment compartment in the centre and a filtration compartment around it, the wall 2 being inclined so that it flares out towards the top.

The wall 1 and the dividing wall 2 can be bodies of revolution or sides of geometrical bodies of any kind.

In a large installation, it is possible to put together a number of vessels of the kind shown and described by providing a common discharge spout 19 for two adjoining vessels.

It is clear that different variations can be made in the shape of the compartments and in their relative dispositions; and the invention is thus not limited to the embodiment described and illustrated.

What I claim is:

1. A clarifying vessel for liquids containing impurities comprising an exterior wall within which is arranged a pretreatment compartment containing a bed of granular material adapted to become fluidized when impure liquid is arranged to initially flow upwardly therethrough and a centrally located filtration compartment containing a bed of sand through which the pretreatment liquid flows downwardly to an exit, said pretreatment compartment surrounding said filtration compartment and being shaped so that it is wider at the top than at the bottom, said two compartments being separated one from the other by a dividing wall which is less than the height of the exterior wall, and over which said liquid flows after having passed through said pretreatment compartment so as to flow into said filtration compartment, said pretreatment compartment having a conduit for feeding said liquid to be clarified in the bottom thereof and adjacent said exterior wall, said conduit having a series of exit holes formed therein, said exit holes only opening toward the bottom and said exterior wall of said pretreatment compartment to aid in the fluidization of the bed, cleaning means for removing any impurities which accumulate in the fluidized bed, and then returning the purified granular material to said pretreatment compartment.

2. A vessel as claimed in claim 1 in which the cleaning means include a first pipe connected to the inlet orifice of a pump and which opens into the fluidized bed, a second pipe connecting said pump to a separator and a third pipe connecting said separator to said pretreatment compartment for the reintroduction of the fluidized material into the pretreatment compartment from a predetermined distance from the first pipe.

3. A vessel as claimed in claim 2 in which said separator is a hydrocyclone separator.

4. A vessel as claimed in claim 3 in which a discharge spout for washing waters is provided externally at the top of the exterior wall.

5. A clarifying vessel for liquids containing impurities comprising an exterior wall within which is arranged a pretreatment compartment containing a bed of granular material adapted to become fluidized when the impure liquid is flowed upwardly therethrough and a filtration compartment containing a bed of sand, an exit at the bottom of said filtration compartment, said two compartments being adjacent to each other within said exterior wall and being separated from each other by a dividing wall which is of a height less than that of the exterior wall so that said liquid will flow over it after having passed through said pretreatment compartment and into said filtration compartment and downwardly therethrough, said pretreatment compartment having at least one conduit for feeding said liquid to be clarified in the bottom thereof adjacent said exterior wall, said conduit having a series of exit holes formed therein, said exit holes only opening towards the bottom and the exterior of said pretreatment compartment to aid in the fluidization of said bed, cleaning means for removing any impurities which accumulate in the fluidized bed and then returning the purified granular material to the pretreatment compartment.

6. A vessel as claimed in claim 5 in which the cleaning means includes a first pipe connected to the inlet orifice of a pump and which opens into the fluidized bed, a second pipe connecting said pump to a separator and a third pipe connecting said separator to said pretreatment compartment for the reintroduction of the fluidized material into the pretreatment compartment at a predetermined distance from the first pipe.

7. A vessel as claimed in claim 6 in which said separator is a hydrocyclone separator.

References Cited

UNITED STATES PATENTS 2,585,808   2/1952   Makkonen _____ 210—197
2,948,400   8/1960   Hagen _____ 210—256

REUBEN FRIEDMAN, *Primary Examiner.*

J. L. DE CESARE, *Assistant Examiner.*

U.S. Cl. X.R.

210—256, 265